US012577101B2

(12) United States Patent　　(10) Patent No.: US 12,577,101 B2
Dahl et al.　　　　　　　　　　　　(45) Date of Patent:　　Mar. 17, 2026

---

(54) PROCESS FOR THE PRODUCTION OF SYNTHESIS GAS

(71) Applicant: Topsoe A/S, Kgs. Lyngby (DK)

(72) Inventors: Per Juul Dahl, Vedbæk (DK); Nitin Sharma, Faridabad (IN)

(73) Assignee: Topsoe A/S, Kgs. Lyngby (DK)

( * ) Notice: Subject to any disclaimer, the term of this patent is extended or adjusted under 35 U.S.C. 154(b) by 735 days.

(21) Appl. No.: 17/801,018

(22) PCT Filed: Mar. 1, 2021

(86) PCT No.: PCT/EP2021/055051
　　　§ 371 (c)(1),
　　　(2) Date: Aug. 19, 2022

(87) PCT Pub. No.: WO2021/175785
　　　PCT Pub. Date: Sep. 10, 2021

(65)　　　　Prior Publication Data
　　　US 2023/0098920 A1　　　Mar. 30, 2023

(30)　　　Foreign Application Priority Data

Mar. 3, 2020　(DK) ........................... PA 2020 00270
　Dec. 18, 2020　(IN) ............................. 202011055200

(51) Int. Cl.
　　　*C01B 3/48*　　　(2006.01)
　　　*B01D 3/38*　　　(2006.01)
(52) U.S. Cl.
　　　CPC ................. *C01B 3/48* (2013.01); *B01D 3/38*
　　　　(2013.01); *C01B 2203/0205* (2013.01); *C01B 2203/0283* (2013.01)
(58) Field of Classification Search
　　　CPC .............. C01B 3/48; C01B 2203/0205; C01B 2203/0283; B01D 3/38
　　　See application file for complete search history.

(56)　　　　　References Cited

U.S. PATENT DOCUMENTS 4,681,603　A　　7/1987　Spangler et al.
2012/0273355　A1　11/2012　Farkas et al.
　　　　　　　　(Continued)

FOREIGN PATENT DOCUMENTS

CL　　2006002321　　　9/2006
CL　　2012000177　　　1/2012
　　　　　　　(Continued)

OTHER PUBLICATIONS

"Condensate Recovery from Ammonia Plants EO—Darl Kuhn", ip.com, ip.com Inc., West Henrietta, NY, US, (Sep. 15, 2012), ISSN 1533-0001, XP013153899.
　　　　　　　(Continued)

*Primary Examiner* — Anthony J Zimmer
*Assistant Examiner* — Syed T Iqbal
(74) *Attorney, Agent, or Firm* — Blank Rome LLP

(57)　　　　　　ABSTRACT

A process for producing synthesis gas, the process comprising the steps of a) reforming a hydrocarbon feed in a reforming section thereby obtaining a synthesis gas comprising CH4, CO, CO2, H2 and H2O and impurities comprising ammonia; b) shifting the synthesis gas in a shift section comprising one or more shift steps in series to a shifted synthesis gas; c) separating from the shifted synthesis gas a process condensate originating from cooling and optionally washing of the shifted synthesis gas; d) passing the process condensate to a condensate steam stripper, wherein dissolved shift byproducts comprising ammonia, methanol and amines formed during shifting the synthesis gas are stripped out of the process condensate using steam resulting in a stripper steam stream, e) adding a part of the stripper steam stream from the process condensate steam strip-per to the hydrocarbon feed and/or to the synthesis gas downstream the reforming section, up-stream the last shift step, wherein the remaining part of stripper steam is purged.

5 Claims, 1 Drawing Sheet

(56) References Cited

U.S. PATENT DOCUMENTS

| | | | |
|---|---|---|---|
| 2015/0315020 A1 * | 11/2015 | Darde | C01B 3/48 |
| | | | 422/162 |
| 2017/0369313 A1 | 12/2017 | Guillou et al. | |
| 2019/0382277 A1 | 12/2019 | Speth et al. | |
| 2023/0121402 A1 | 4/2023 | Dahl | |

FOREIGN PATENT DOCUMENTS

| | | | |
|---|---|---|---|
| CL | 2022002348 | 8/2022 | |
| CN | 110267916 A | 9/2019 | |
| EP | 0 624 388 A1 | 11/1994 | |
| WO | WO 2011/009565 | 1/2011 | |
| WO | WO 2018/162594 A1 | 9/2018 | |
| WO | WO-2018162576 A1 * | 9/2018 | B01D 19/001 |

OTHER PUBLICATIONS

R.G. Towers et al., "Condensate Recovery from Ammonia Plants", IP.com Electronic Publication No. IPCOM000221798D, Sep. 15, 2012.

* cited by examiner

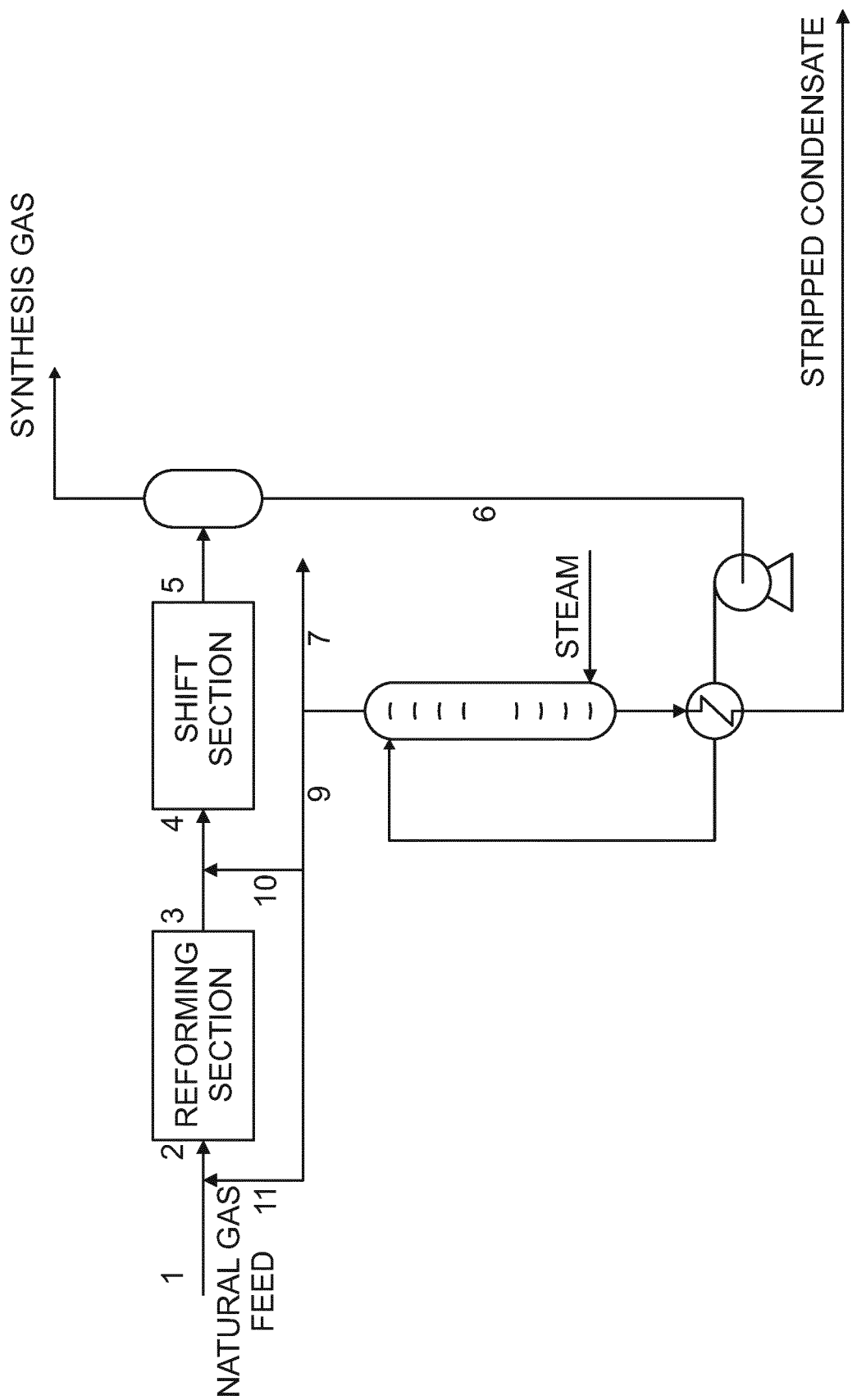

PROCESS FOR THE PRODUCTION OF SYNTHESIS GAS

BACKGROUND OF THE INVENTION

1. Field of the Invention:

The present invention relates to a process for the production of synthesis gas.

2. Description of the Related Art:

Synthesis gas is typically produced by reforming a hydrocarbon feed stock either by steam reforming (SMR), secondary reforming, such as autothermal reforming (ATR) and two-step reforming with SMR and ATR in series.

The synthesis gas leaving the reforming process contains hydrogen, carbon monoxide and carbon dioxide together with unconverted hydrocarbons, usually methane.

The synthesis gas contains additionally small amounts of nitrogen stemming from the hydrocarbon feed or from the air employed in the secondary or autothermal reformer.

The nitrogen will cause formation of ammonia in the reforming section corresponding to the conditions in the last reforming step. The ammonia formation is an equilibrium reaction.

In number of process applications, carbon monoxide and carbon dioxide contained in the synthesis gas from the reforming process must be removed prior to synthesis gas is introduced into the process. This is in particular true in the preparation of ammonia and hydrogen.

For this purpose, carbon monoxide is converted to carbon dioxide, which can be removed by known chemical or physical carbon dioxide processes.

Carbon monoxide is converted to carbon dioxide by passing the synthesis gas through a shift section where carbon monoxide is converted to carbon dioxide by the water gas shift process.

It is well known that a shift reaction cannot be performed without formation of by-products. Most Shift catalysts contain Cu. For these catalysts, one important by-product formed in the shift reaction is methanol. Methanol reacts to amines with ammonia formed in the reforming process from the nitrogen being present in the hydrocarbon feed and/or in air as mentioned hereinbefore.

The shifted synthesis gas is subsequent to the shift section cooled and passed into a condenser where process condensate is separated from the shifted synthesis gas.

The ammonia and amines contained in the shifted synthesis gas are condensed out together with the process condensate after the shift section.

Typically, the process condensate is send to a medium pressure (MP) steam stripper where dissolved gases inclusive ammonia and amines are stripped off with steam in order to allow the stripped condensate to be passed to boiler feed water (BFVV) water treatment.

The medium pressure is defined as a pressure which is 0.5 bar, preferably 1 bar, higher than the pressure inlet the reforming section The steam exiting the steam stripper contains the dissolved gases and the ammonia and amines by-products. According to the invention, a part of this so-called stripper stream is added to the hydrocarbon feed and/or to the synthesis gas downstream the reforming section and upstream the last shift reactor. The remaining part of the stripper steam is purged.

The amines react in the reforming section to $N_2$, $CO_2$, CO, $H_2$ and $H_2O$.

The ammonia and amines added downstream the reforming section and upstream the last shift reactor will accumulate in the section and thus cause increased level of ammonia and amines in the process condensate. Newly formed ammonia is continuously admitted to the shift section from the reforming section. The formed amines and the residual ammonia will only be removed by stripper steam admitted to the reforming section. The stripper steam added downstream the reforming section does not contribute to the removal of amines. Addition at this point is only to control steam/drygas at inlet of the shift section.

A problem arises when the content of amines is high in the feed steam to the reforming section as this leads to carbon formation in the reforming section either in the preheat equipment or on the catalyst bed.

The invention solves this problem by purging a required part of the stripper steam, thus reducing the amine level at inlet of the reforming section to an acceptable level.

DESCRIPTION OF THE INVENTION

Thus, the invention is a process for producing synthesis gas, the process comprising the steps of:

a) reforming a hydrocarbon feed in a reforming section thereby obtaining a synthesis gas comprising CH4, CO, CO2, H2 and H2O and impurities comprising ammonia;

b) shifting the synthesis gas in a shift section comprising one or more shift steps in series to a shifted synthesis gas;

c) separating from the shifted synthesis gas a process condensate originating from cooling and optionally washing of the shifted synthesis gas;

d) passing the process condensate to a condensate steam stripper, wherein dissolved shift byproducts comprising ammonia, methanol and amines formed during shifting the synthesis gas are stripped out of the process condensate using steam resulting in a stripper steam stream, e) adding a part of the stripper steam stream from the process condensate steam stripper to the hydrocarbon feed and/or to the synthesis gas downstream the reforming section, up-stream the last shift step, wherein the remaining part of stripper steam is purged.

In an embodiment of the invention, the condensate steam stripper is a medium pressure stripper. The medium pressure is defined as a pressure which is 0.5 bar, preferably 1 bar, higher than the pressure inlet the reforming section. This enables the stripper steam to be used as process steam.

In a further embodiment all stripper steam can be admitted downstream the reforming section upstream the last shift

EXAMPLE

Reference is Made to FIG. 1.

The stream numbers in the tables below refers to the reference numbers in FIG. 1. Table 1 shows a case for removing formed ammonia and amines by converting these in the reforming section by adding 8.4% of the stripped steam to this unit.

Table 2 shows a case for removing formed ammonia and amines by purging 8% of the process condensate.

There is in both cases the same built-up of ammonia and amines in the shift section. This built-up can be reduced or removed by admitting all the stripped steam to either the reforming section or the process condensate purge.

TABLE 1

| Stream | 1 | 2 | 3 | 4 | 5 | 6 | 7 | 9 | 10 | 11 |
|---|---|---|---|---|---|---|---|---|---|---|
| Flow T/h | 92 | 100 | 168 | 255 | 255 | 125 | 0 | 95 | 87 | 8 |
| Ammonia Kg/g | 0 | 40 | 42 | 482 | 480 | 480 | 0 | 480 | 440 | 40 |
| Amines Kg/h | 0 | 3 | 0 | 33 | 36 | 36 | 0 | 36 | 33 | 3 |

TABLE 2

| Stream | 1 | 2 | 3 | 4 | 5 | 6 | 7 | 9 | 10 | 11 |
|---|---|---|---|---|---|---|---|---|---|---|
| Flow T/h | 100 | 100 | 168 | 255 | 255 | 125 | 8 | 87 | 87 | 0 |
| Ammonia Kg/g | 0 | 0 | 42 | 480 | 478 | 478 | 40 | 438 | 438 | 0 |
| Amines Kg/h | 0 | 0 | 0 | 33 | 36 | 36 | 3 | 33 | 33 | 0 | reactor. The built-up of ammonia and amines in the shift section will in this case be control by the rate of stripper steam purge flow.

The purge of the stripper steam can be handled in different ways.

In an embodiment of the invention, the purge stripper steam is passed to a hydrocarbon combustion step.

In this embodiment it is preferred that the hydrocarbon combustion step is the fuel side of a steam reformer or that the hydrocarbon combustion step is the fuel side of a fired heater.

Additionally, it is preferred that the purge stripper steam is mixed with the combustion air or hydrocarbon fuel before entering the hydrocarbon combustion step.

The amount of purged stripper steam can be adjusted to reject all or part of the amines from the stripper stream added to the hydrocarbon feed and/or to the synthesis gas in step (e). In case of partly rejection, remaining amines can be removed by admitting an acceptable level of amines to the reforming section via the stripper steam from the condensate steam stripper.

The stripped condensate leaves the bottom of the condensate steam stripper and is sent to water treatment.

BRIEF DESCRIPTION OF THE DRAWING

FIG. 1 is a block dia gram showing the process for producing synthesis gas in accordance with the present invention.

The invention claimed is:

1. A process for producing synthesis gas, the process comprising the steps of:
   a) reforming a hydrocarbon feed in a reforming section thereby obtaining a synthesis gas comprising $CH_4$, CO, $CO_2$, $H_2$ and $H_2O$ and impurities comprising ammonia;
   b) shifting the synthesis gas in a shift section comprising one or more shift steps in series to a shifted synthesis gas;
   c) separating from the shifted synthesis gas a process condensate originating from cooling and optionally washing of the shifted synthesis gas;
   d) passing the process condensate to a condensate steam stripper, wherein dissolved shift byproducts comprising ammonia, methanol and amines formed during shifting the synthesis gas are stripped out of the process condensate using steam, resulting in a condensate stripper steam stream;
   e) adding a part of the condensate stripper steam stream from the process condensate steam stripper to the hydrocarbon feed and/or to the synthesis gas downstream the reforming section, up-stream the last shift step, wherein the remaining part of the condensate stripper steam is purged; and
   f) passing the purged condensate stripper steam to a hydrocarbon combustion step.

2. The process of claim 1, wherein the condensate steam stripper is a medium pressure stripper.

3. The process of claim 1, wherein the hydrocarbon combustion step is a fuel side of a steam reformer.

4. The process of claim 1, wherein the hydrocarbon combustion step is a fuel side of a fired heater.

5. The process of claim 1, wherein the purged condensate stripper steam is mixed with the combustion air or hydrocarbon fuel before entering the hydrocarbon combustion step.

* * * * *